United States Patent
Rosado

(10) Patent No.: US 11,489,671 B2
(45) Date of Patent: Nov. 1, 2022

(54) SERVERLESS CONNECTED APP DESIGN

(71) Applicant: salesforce.com, inc., San Francisco, CA (US)

(72) Inventor: Eidan James Rosado, Deerfield Beach, FL (US)

(73) Assignee: Salesforce, Inc., San Francisco, CA (US)

(*) Notice: Subject to any disclaimer, the term of this patent is extended or adjusted under 35 U.S.C. 154(b) by 682 days.

(21) Appl. No.: 16/451,411

(22) Filed: Jun. 25, 2019

(65) Prior Publication Data

US 2020/0412538 A1 Dec. 31, 2020

(51) Int. Cl.
*H04L 9/32* (2006.01)
*G06F 9/455* (2018.01)
*H04L 61/4523* (2022.01)

(52) U.S. Cl.
CPC ........ *H04L 9/3213* (2013.01); *G06F 9/45558* (2013.01); *H04L 61/4523* (2022.05); *G06F 2009/45587* (2013.01); *G06F 2009/45595* (2013.01)

(58) Field of Classification Search
CPC . H04L 9/3213; H04L 61/1523; H04L 63/126; H04L 63/0281; H04L 63/102; H04L 9/3247; H04L 63/062; H04L 9/0861; H04L 61/2007; G06F 9/45558; G06F 2009/45587; G06F 2009/45595
See application file for complete search history.

(56) References Cited

U.S. PATENT DOCUMENTS

| | | | |
|---|---|---|---|
| 11,036,554 B1 * | 6/2021 | Prock | G06F 9/45558 |
| 2018/0219863 A1 * | 8/2018 | Tran | H04W 12/06 |
| 2020/0059360 A1 * | 2/2020 | Martynov | H04L 9/3247 |
| 2020/0162454 A1 * | 5/2020 | Jain | H04W 12/084 |

\* cited by examiner

*Primary Examiner* — Mohammad W Reza
(74) *Attorney, Agent, or Firm* — Butzel Long; Donald J. Lecher

(57) ABSTRACT

A system for authorizing a serverless application function having a plurality of tenants, each tenant may include one or more entities that share a common access to a processing space and a data store. The system includes a gateway that receives a request from a tenant, an authorization component that access a public key assigned to the tenant, and a serverless processor that generates public and private keys for the tenant. The serverless processor also generates an access token for the first tenant that is signed using the private key and requests a transaction token from the authorization component using the access token. The authorization component transmits a transaction token to the serverless processor, which is used to make further requests to a virtual environment.

19 Claims, 4 Drawing Sheets

SERVERLESS CONNECTED APP DESIGN

BACKGROUND

Cloud computing may allow developers to deliver applications over a network as a service via an infrastructure provider. The infrastructure provider may abstract or obscure the underlying hardware and other resources used to deliver a service to relieve the developer from having to configure or be concerned with efficiently allocating and using those resources. Cloud computing may reduce the costs of delivering an application as a service because the developer may not need to administer the hardware infrastructure, electrical and temperature controls, physical security, and other logistics.

Multi-tenant cloud-based architectures may improve collaboration, integration, and community-based cooperation between tenants without sacrificing data security. In a multi-tenant system, a hardware and software platform may simultaneously support multiple tenants from a common data store. Each tenant may be assigned to a virtual environment that corresponds to a dedicated portion of the common data store. A tenant may be, for example, a user, a group of users, a website, a mobile application, an e-commerce store, an application programming interface (API), or the like. Multi-tenant architectures may allow for execution of applications within a common processing space, thereby simplifying access to specific sets of data for any tenant or user. Similarly, applications and services may be more easily shared between multiple tenants.

BRIEF SUMMARY

According to an embodiment of the disclosed subject matter, a system for authorizing a serverless application function may include a plurality of tenants. Each tenant may include one or more entities that share a common access to a processing space and a data store. The processing space may be implemented on at least one of a plurality of instance nodes in communication with one another. Each tenant of the plurality of tenants may be assigned to a virtual environment that corresponds to a dedicated portion of the data store. The system may include a gateway. The gateway may receive a first request from a first tenant. The first tenant may share access to the processing space and the data store with one or more other tenants. The first tenant may have access, based on an assigned set of privileges, to a portion of the data store that is isolated from the one or more other tenants. The system may include an authorization component that may access a public key assigned to the first tenant within the system. The system may include a serverless processor coupled to the gateway that may execute code stored in a memory in response to the first request. The serverless processor may be configured to generate the public key and a private key, assign the public key and private key to the first tenant, transmit the public key to the authorization component, generate an access token for the first tenant that is signed using the first tenant's assigned private key, transmit a second request for a transaction token to the authorization component including the access token, receive the transaction token from the authorization component, and transmit a third request to the virtual environment including the transaction token. The gateway and serverless processor may operate within a common virtual private cloud. The gateway may be further configured to verify that the first tenant is permitted to communicate with the virtual environment using a lightweight directory access protocol to access a directory within the authorization component. The access token may be implemented as a JSON web token. The transaction token may be implemented as an OAuth token. The virtual environment and authorization component may execute within a same instance or a same point of deployment (pod). The access token may include an audience field that identifies a recipient of the access token and an issuer field that identifies an issuer of the access token. The access token may uniquely correspond to the first tenant. The transaction token may include an organization identifier that uniquely identifies the virtual environment within the system. The transaction token may be set to expire based on the access token. The authorization component may be further configured to verify the second request using the public key.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
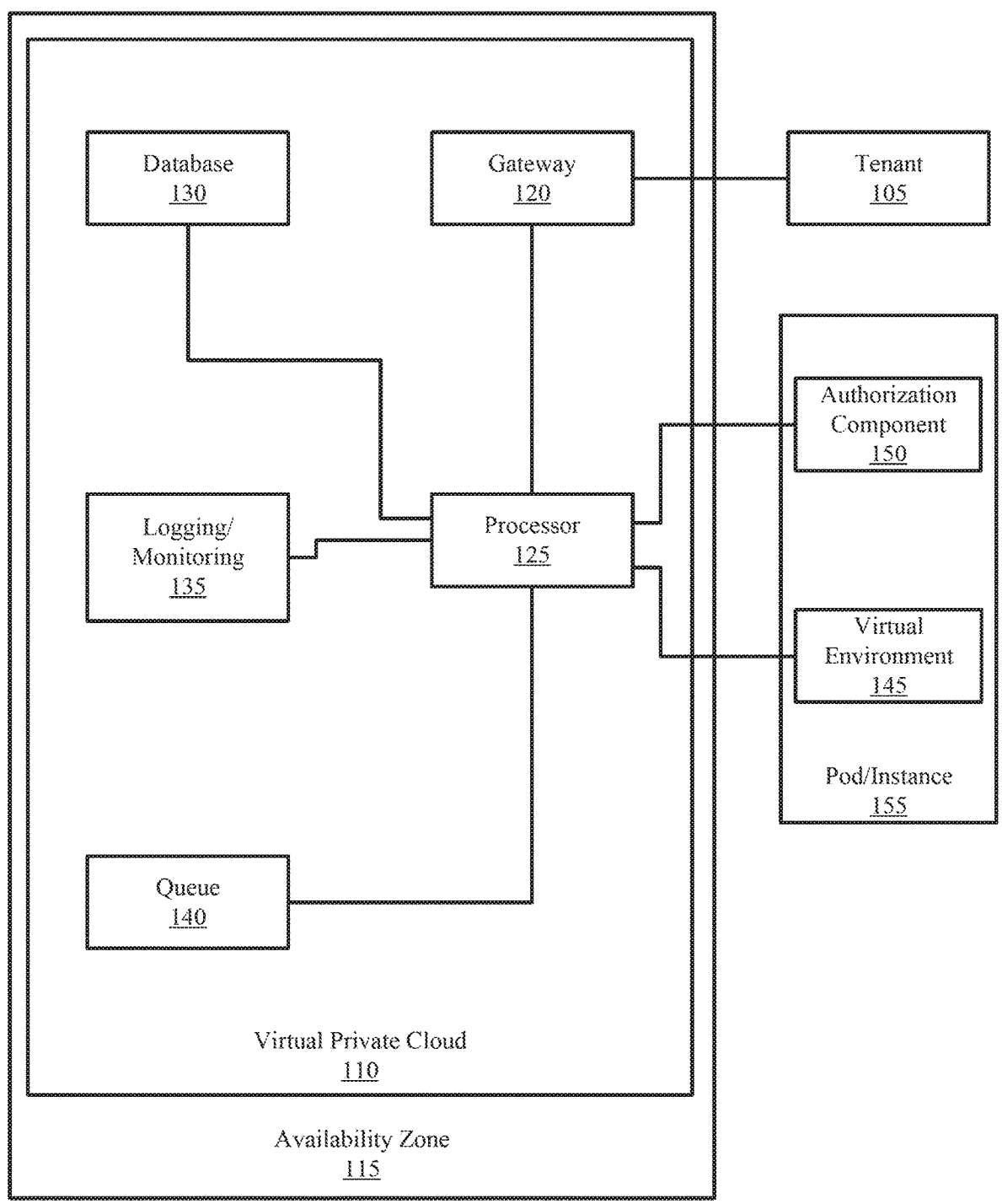
FIG. 1 illustrates an example of a system according to an embodiment of the disclosed subject matter.

A software developer may wish to utilize a serverless framework to provide an application function within a multi-tenant system. A cloud-based infrastructure provider may host the application function where it may be executed with less overhead and increased flexibility compared with applications hosted on traditional servers or virtual machines. Fees associated with the serverless framework may be assessed based on the time in which the application function executes, and no fees may be incurred where the application function is idle. Additionally, the serverless framework may reduce the software developer's burden in configuring and maintaining the application function and reduce the time needed to deploy it.

The present subject matter discloses a method of authenticating a serverless application function with a multi-tenant system to allow the serverless application function to communicate with the multi-tenant system while obtaining the benefits associated with a serverless architecture, such as reduced developer overhead, improved elasticity, reduced deployment time, and reduced operating costs.

The term "serverless" as used herein refers to a cloud computing execution model where resources may be created and scaled as needed, on demand, and terminated immediately after execution of a function completes. A serverless framework may be used to launch a serverless architecture, where a user may interface with cloud-based computing services rather than the underlying physical servers and associated system software.

The term "connected application" as used herein refers to an application that is integrated with or has otherwise obtained the necessary authorization or credentials to communicate with a multi-tenant system.

The term "tenant" as used herein refers to one or more entities, where each entity may be user, a group of users, a website, a mobile application, an e-commerce store, an API, or the like. One or more entities within a tenant may share common data, stored in a database, with the other entities within that same tenant. Tenants may be representative of customers, customer departments, business or legal organizations, or other groups that maintain data for sets of users within the system. Although multiple tenants may share access to system resources, processing spaces, and data stores, the data and services provided to each tenant may be securely isolated from the data and services provided to other tenants. In this way, the multi-tenant system may allow different sets of entities to share functionality without necessarily sharing any data.

The term "token" as used herein refers to digital data that represents an authorization issued to an entity, such as an API, application, website, user, group of users, and the like, that seeks access to a system, system resource, functionality, or feature. A token may be implemented as a series of characters that define or otherwise indicate a scope of access granted to the token holder, a duration of access granted to the token holder, a data access capability granted to the token holder, and/or a system, system resource, functionality, feature, privilege, or right granted to the token holder.

FIG. 1 illustrates an example of a system 100 that supports authorizing a function, application, processing component, or service to interact with a virtual environment 145. The system 100 includes a tenant 105, which may submit a request to a virtual private cloud (VPC) 110 that operates within an availability zone 115 provided by an infrastructure provider (not shown). Each tenant 105 within the multi-tenant system may have associated tenant-specific data, such as for example, customer data related to sales leads, account numbers, and various other data objects. This tenant-specific data, to which only the assigned tenant may access, may be stored within virtual environment 145. The request from tenant 105 may be initially received at gateway 120. Gateway 120 may act as a gatekeeper for incoming requests. Gateway 120 may accept and process the received request by routing it to an appropriate resource or service, such as processor 125. Processor 125 may be managed by an infrastructure provider to execute code furnished by a software developer. The infrastructure provider may assess a fee based on the time that processor 125 spends executing the supplied code. Processor 125 may advantageously provide features such as automatic scaling, automatic administration of computing resources, monitoring and logging, code deployment, and automatic security updates. In this way, processor 125 may be considered serverless. Processor 125 may execute its associated code to implement an application function in response to changes in tenant data, changes in system state, receiving tenant requests, and the like. Within VPC 110, processor 125 may be further coupled to communicate with a database 130, a logging and monitoring component 135, and a queue 140. One or more static IP addresses may be set and assigned to the VPC 110. A static IP address may be a prerequisite to whitelisting. Once whitelisted, each of components 125, 130, 135, and 140 located within VPC 110 may interface and transact with authorization component 150 and virtual environment 145 and may be subject to a permissions scheme based on the accessing tenant.

Figure 2:
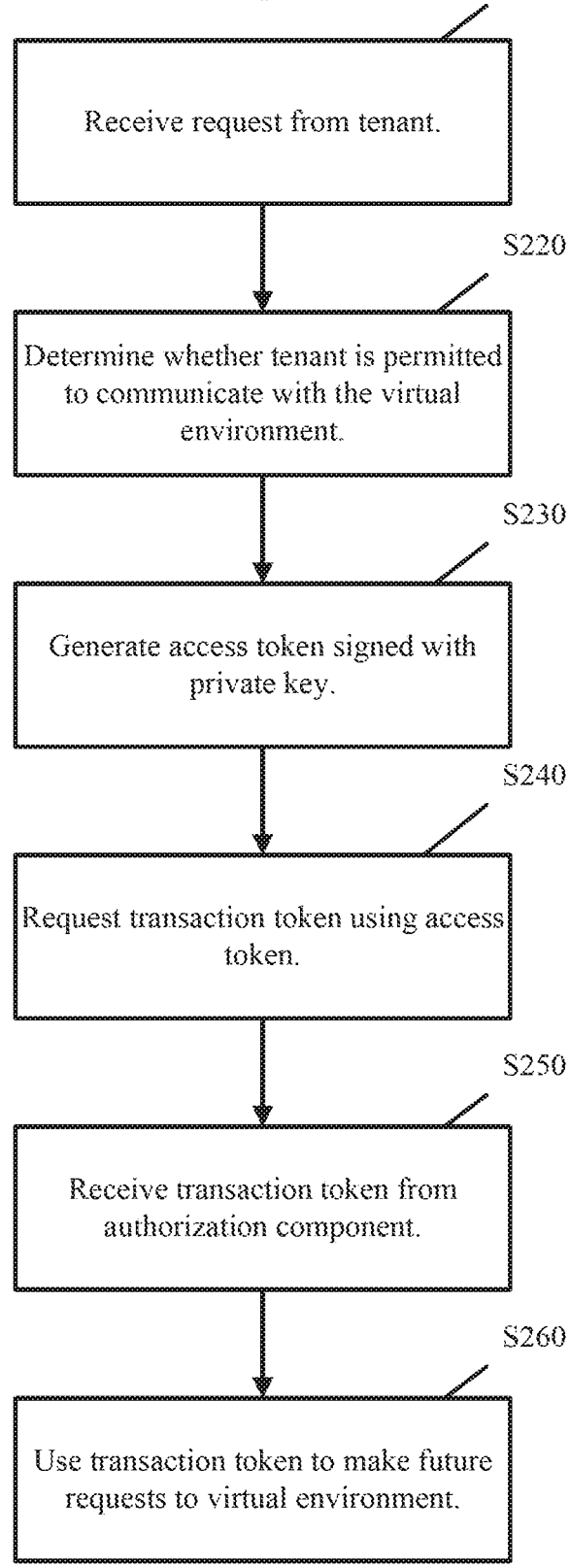
FIG. 2 illustrates a flow diagram of a method according to an embodiment of the disclosed subject matter.

FIG. 2 is a flow diagram illustrating an example of a method 200 for authorizing processor 125, using authorization component 150, to communicate with virtual environment 145. It should be appreciated that method 200 may include any number of additional or alternative tasks. The tasks shown in FIG. 2 need not be performed in the order as shown and may be incorporated into a more comprehensive procedure or process having additional functionality. The method shown in FIG. 2 may commence once each of the components within VPC 110 have been whitelisted. Both authorization component 150 and virtual environment 145 may execute within a point of deployment (pod) 155. Pod 155, also known as an instance, may be a cluster of computing resources used to execute at least the authorization component 150 and virtual environment 145. Applications executing within the same pod 155 may share the same computing resources.

As shown in FIG. 2, the VPC 110 may receive a request from a tenant 105 in S210. The request from tenant 105 may be initially processed by gateway 120. The request from tenant 105 may take the form of a JSON Web Token. Gateway 120 may determine whether the request is valid by verifying the tenant exists within the same directory as, or in other words, by determining that tenant 105 is indeed a tenant of virtual environment 145. This verification may occur, for example, by performing a look-up using a database, such as through database 130 or performing a look-up using a lightweight directory access protocol (LDAP) directory located within authorization component 150. Each service offered within VPC 110 may be listed within the directory of authorization component 150, along with a list of all tenants permitted to communicate or otherwise interact with each service. If the request is confirmed to be valid, a public key and private key may be created for the tenant by the processor 125. The public key may be stored in a data storage component locally or remotely. Preferably, the tenant's public key is stored in authorization component 150. Processor 125 may create an access token using the tenant's private key. The access token may include a header, a payload, and a signature. The header may contain a token type and an algorithm that may define how the signature is computed, for example, using the HMAC-SHA256 algorithm. The payload may include a tenant-specific format comprising several fields, for example, an audience field that identifies the audience, which may be the intended recipient of the access token, an issuer field that may identify the entity transmitting of the access token, an expiration field that may identify when the access token will expire, a timestamp field that may identify the time when the access token becomes valid, a caller context field that may identify an application or cloud, a subject type field that may identify an entity on behalf of which the access token is being transmitted, a token creation timestamp that may identify when the access token was created, and a token identifier field that uniquely identifies and distinguishes one access token from another. The access token may uniquely correspond to each tenant such that no other tenant obtains the same access token. The access token for one tenant may be unique to that tenant, for example, in terms of a payload and a signature that may not be present for an access token used by one or more other tenants. In an embodiment, the access token may be a JSON Web Token and may include one or more of the custom payload fields previously described.

The access token created in S230 may be used to request a transaction token from the authorization component 150 in S240. In response to receiving the access token signed with the tenant's private key, authorization component 150 may verify the access token using the tenant's public key, which may be stored within authorization component 150 as previously discussed. The requested transaction token may be conveniently used to securely conduct transactions with the virtual environment 145 in lieu of, for example, a user ID and password. If the authorization component 150 determines that the access token is indeed valid, it may create the transaction token. The transaction token may expire at a predetermined time and date or after a predetermined period based on the contents of the received access token. In an embodiment, the transaction token may expire after 24 hours. The transaction token may be transmitted from the authorization component 150 to processor 125 in S250. Upon receiving the transaction token, the application function executing on processor 125 may be referred to as a "connected application" and may use the transaction token to conduct transactions with the virtual environment 145 in S260. Examples of transactions may be related to reading or writing data, such as post, put, and get transactions. In an embodiment, the transaction token may be an OAuth token and may include a custom format. For example, the transaction token may include an org ID value and a generated value and may include other fields. The generated value may cause the transaction token to be unique from every previously-generated transaction token. The org ID may have a 15-character length while the generated value may vary in length.

The OAuth authorization protocol may allow a tenant to access system resources on behalf of another entity associated with the resource owner. The OAuth protocol may utilize assertion flows with requests and various other parameters, commands, and instructions. OAuth may provide transaction tokens in lieu of credentials, such as a user ID and password, to allow access to system resources.

Each virtual private cloud may be tenant-specific based on the tenant-specific paths used by that virtual private cloud (e.g., each virtual private cloud may correspond to a separate tenant). Additionally, each virtual private cloud may include an access role (e.g., an identity and access management role) defining the data objects or data object types accessible by that virtual private cloud or defining other permissions for the data access. By accessing the requested data objects according to the tenant-specific paths and access roles, the virtual private clouds may securely maintain separate virtual environments for different tenants and may only allow user access to approved tenant data.

The system 100 may support isolated application function execution environments, such as virtual environment 145, for different tenants of the multi-tenant system. For example, by spinning up separate processors 125 on a tenant-by-tenant basis, the system 100 may not mix sensitive data for different tenants but may allow application function execution across multiple tenants. Additionally, a malicious user gaining access to the application function execution environment may only gain access to data for a single tenant (e.g., the tenant associated with that data testing environment), and may not be able to modify that data based on the permissions associated with the virtual private cloud. By incorporating the authorization component 150 for granting or denying access to the virtual environment 145 on a tenant-by-tenant basis, the system 100 may improve data security.

Embodiments disclosed herein may allow for more efficient execution of applications and application functions in conjunction with a multi-tenant system than would be achievable using conventional techniques. For example, the serverless architecture and authorization method proposed may be reduce the operating costs, improve the elasticity, and reduce the administrative overhead of executing a cloud-based application function. This is due to the use of the authorization technique in combination with the unique multi-tenant system architecture, as previously disclosed, which allows for multiple entities to share system resources and functionality without necessarily sharing data.

Figure 3:
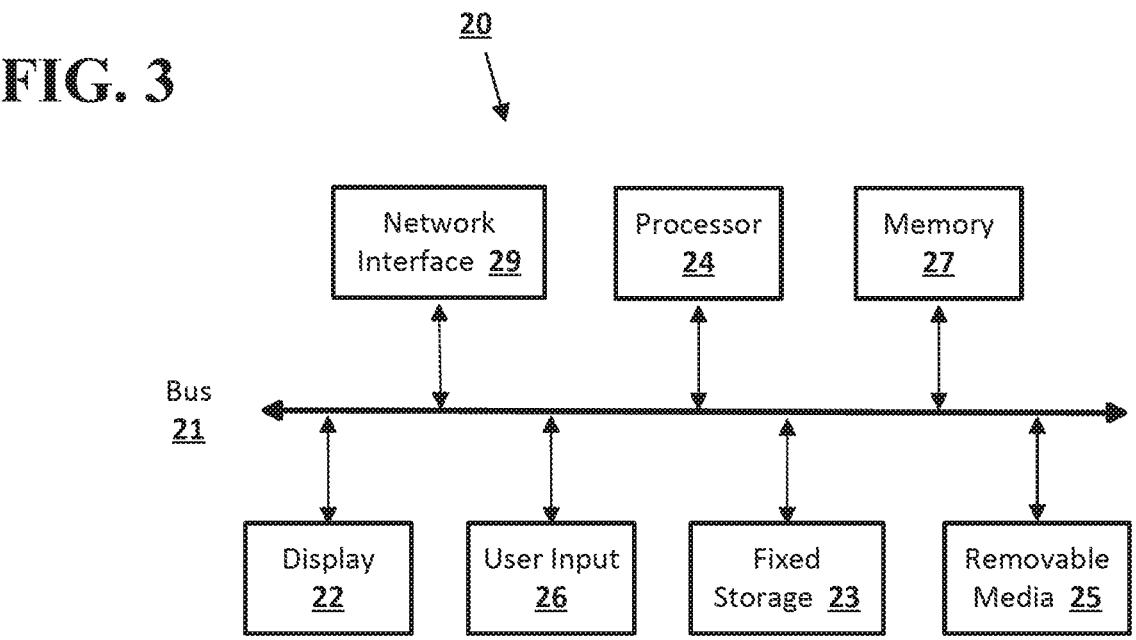
FIG. 3 illustrates a computing device according to an embodiment of the disclosed subject matter.

Embodiments of the presently disclosed subject matter may be implemented in and used with a variety of component and network architectures. FIG. 3 is an example computing device 20 suitable for implementing embodiments of the presently disclosed subject matter. The device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components, which may include RAM, ROM, and other memory, as previously noted. Typically, RAM is the main memory into which an operating system and application programs are loaded. A ROM or flash memory component can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the computer to communicate with other computers via one or more local, wide-area, or other communication networks, as described in further detail below.

Many other devices or components (not shown) may be connected in a similar manner (e.g., document scanners, digital cameras and so on). Conversely, all the components shown in FIG. 3 need not be present to practice the present disclosure. The components can be interconnected in different ways from that shown. The operation of a computer such as that shown in FIG. 3 is readily known in the art and is not discussed in detail in this application. Code to implement the present disclosure can be stored in computer-readable storage media such as one or more of the memory 27, fixed storage 23, removable media 25, or on a remote storage location.

Figure 4:
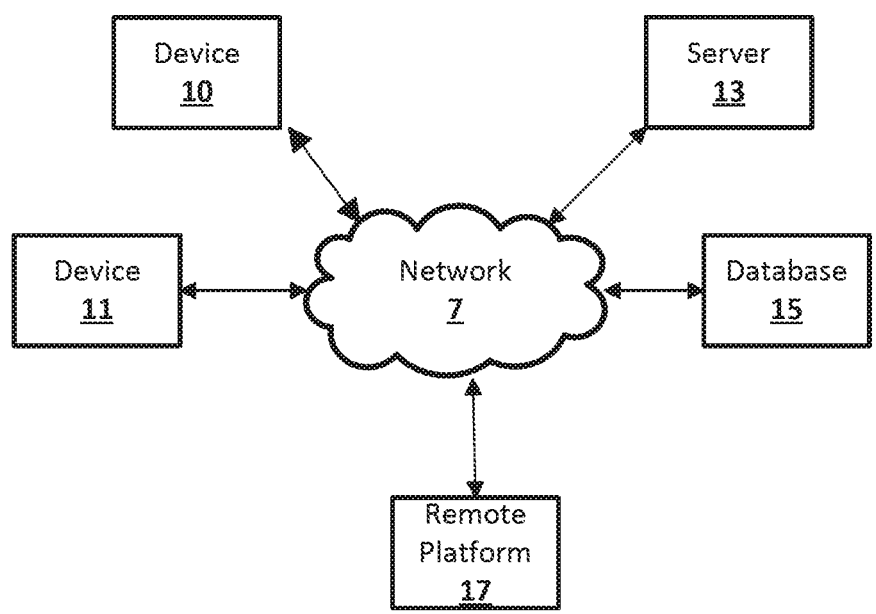
FIG. 4 illustrates a network configuration according to an embodiment of the disclosed subject matter.

FIG. 4 shows an example network arrangement according to an embodiment of the disclosed subject matter. One or more devices 10, 11, such as local computers, smart phones, tablet computing devices, and the like may connect to other devices via one or more networks 7. Each device may be a computing device as previously described. The network may be a local network, wide-area network, the Internet, or any other suitable communication network or networks, and may be implemented on any suitable platform including wired and/or wireless networks. The devices may communicate with one or more remote devices, such as servers 13 and/or databases 15. The remote devices may be directly accessible by the devices 10, 11, or one or more other devices may provide intermediary access such as where a server 13 provides access to resources stored in a database 15. The devices 10, 11 also may access remote platforms 17 or services provided by remote platforms 17 such as cloud computing arrangements and services. The remote platform 17 may include one or more servers 13 and/or databases 15.

Figure 5:
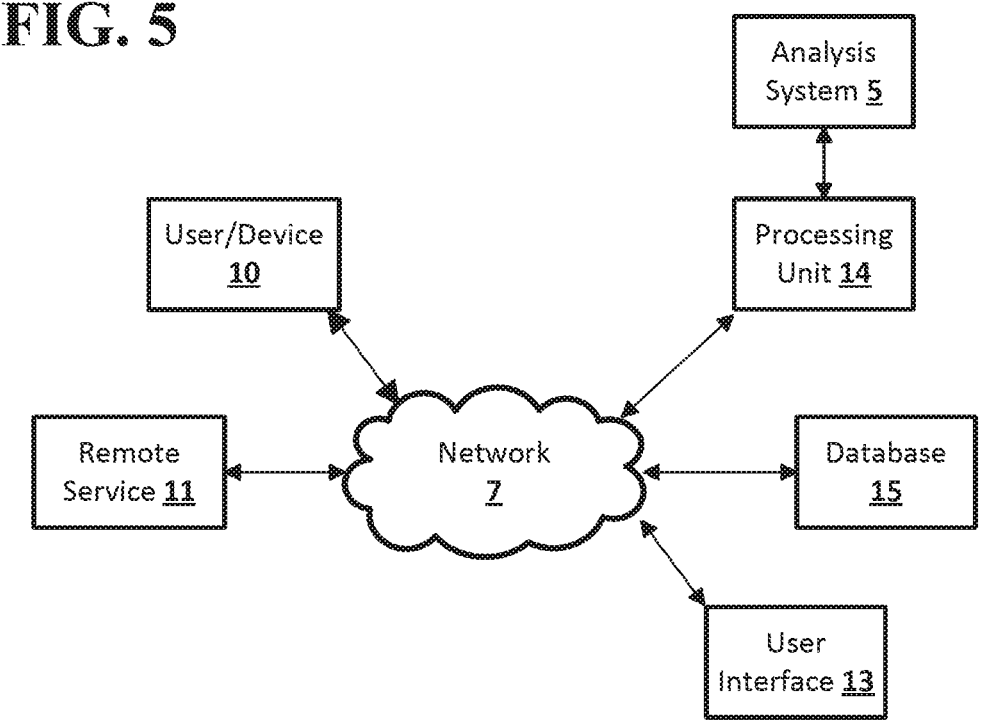
FIG. 5 illustrates an example network and system configuration according to an embodiment of the disclosed subject matter.

FIG. 5 shows an example arrangement according to an embodiment of the disclosed subject matter. One or more devices or systems 10, 11, such as remote services or service providers 11, user devices 10 such as local computers, smart phones, tablet computing devices, and the like, may connect to other devices via one or more networks 7. The network may be a local network, wide-area network, the Internet, or any other suitable communication network or networks, and may be implemented on any suitable platform including wired and/or wireless networks. The devices 10, 11 may communicate with one or more remote computer systems, such as processing units 14, databases 15, and user interface systems 13. In some cases, the devices 10, 11 may communicate with a user-facing interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to a web browser client on a user device 10, and a computer-readable API or other interface is provided to a remote service client 11.

The user interface 13, database 15, and/or processing units 14 may be part of an integral system, or may include multiple computer systems communicating via a private network, the Internet, or any other suitable network. One or more processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A system for authorizing a serverless application function, the system having a plurality of tenants, each tenant comprising one or more entities that share a common access to a processing space and a data store, wherein the processing space may be implemented on at least one of a plurality of instance nodes in communication with one another, and each tenant of the plurality of tenants is assigned to a virtual environment that corresponds to a dedicated portion of the data store, the system comprising:
   a common virtual private cloud including a gateway and a serverless processor; and
   one of a same instance or a point of deployment including the processing space, an authorization component and the virtual environments of each corresponding tenant of the plurality of tenants, the gateway configured to receive a first request from a first tenant for access to a first tenant dedicated portion of the data store, the first tenant having access to the processing space and the data store through the common virtual private cloud based on an assigned set of privileges, where the first tenant dedicated portion of the data store is isolated from access by the other plurality of tenants;

the authorization component configured to access a public key assigned to the first tenant within the system;

the serverless processor coupled to the gateway and configured to execute code stored in a memory in response to the first request, wherein the serverless processor is further configured to:
generate the public key and a private key;
assign the public key and private key to the first tenant;
transmit the public key to the authorization component;
generate an access token for the first tenant, the access token signed using the first tenant's assigned private key;
transmit a second request for a transaction token to the authorization component, the second request including the access token;
receive the transaction token from the authorization component; and
transmit a third request to the virtual environment, the third request including the transaction token, wherein the transaction token is configured to conduct transactions through the common virtual private cloud between the first tenant and the first tenant dedicated portion of the data store.

2. The system of claim 1, wherein the gateway is further configured to verify that the first tenant is permitted to communicate with the virtual environment using a lightweight directory access protocol to access a directory within the authorization component.

3. The system of claim 1, wherein the access token is a JSON web token.

4. The system of claim 1, wherein the transaction token is an OAuth token.

5. The system of claim 2, wherein the access token includes an audience field that identifies a recipient of the access token and an issuer field that identifies an issuer of the access token.

6. The system of claim 1, wherein the access token uniquely corresponds to the first tenant.

7. The system of claim 1, wherein the transaction token includes an organization identifier that uniquely identifies the virtual environment within the system.

8. The system of claim 1, wherein an expiration of the transaction token is set based on the access token.

9. The system of claim 1, wherein the authorization component is further configured to verify the second request using the public key.

10. A method of authorizing a serverless application function in a system having a plurality of tenants, each tenant comprising one or more entities that share a common access to a processing space and a data store, wherein the processing space may be implemented on at least one of a plurality of instance nodes in communication with one another, and each tenant of the plurality of tenants is assigned to a virtual environment that corresponds to a dedicated portion of the data store, the method comprising:
receiving a first request from a first tenant for access to a first tenant dedicated portion of the data store, the first tenant having access to the processing space and the data store through a common virtual private cloud based on an assigned set of privileges, where the first tenant dedicated portion of the data store is isolated from access by the other plurality of tenants;
generating, using a serverless processor in the common virtual private cloud, a public key and a private key and assigning both to the first tenant;
transmitting the public key to an authorization component in the processing space;
generating, using the serverless processor, an access token for the first tenant, the access token signed using the first tenant's assigned private key;
transmitting, using the serverless processor, a second request for a transaction token to the authorization component, the second request including the access token;
receiving, using the serverless processor, the transaction token from the authorization component; and
transmitting, using the serverless processor, a third request to the virtual environment, the third request including the transaction token, wherein the transaction token is configured to conduct transactions through the common virtual private cloud between the first tenant and the first tenant dedicated portion of the data store.

11. The method of claim 10, further comprising:
verifying that the first tenant is permitted to communicate with the virtual environment, the verifying performed using a lightweight directory access protocol to access a directory within the authorization component.

12. The method of claim 10, wherein the access token is a JSON web token.

13. The method of claim 10, wherein the transaction token is an OAuth token.

14. The method of claim 10, wherein the virtual environment and authorization component operate within a same instance or a same point of deployment (pod).

15. The method of claim 12, wherein the access token includes an audience field that identifies a recipient of the access token and an issuer field that identifies an issuer of the access token.

16. The method of claim 10, wherein the access token uniquely corresponds to the first tenant.

17. The method of claim 10, wherein the transaction token includes an organization identifier that uniquely identifies the virtual environment within the system.

18. The method of claim 10, wherein the authorization component is further configured to verify the second request using the public key.

19. The method of claim 10, wherein an expiration of the transaction token is set based on the access token.

* * * * *